US012591971B2

(12) United States Patent　　(10) Patent No.:　US 12,591,971 B2
Liu et al.　　　　　　　　　　　(45) Date of Patent:　　Mar. 31, 2026

(54) INFORMATION PROCESSING METHOD, MEDICAL IMAGE DIAGNOSTIC APPARATUS, AND INFORMATION PROCESSING SYSTEM INCLUDING DEEP LEARNING FOR OPTIMAL CARDIAC PHASE SELECTION

(71) Applicant: CANON MEDICAL SYSTEMS CORPORATION, Tochigi (JP)

(72) Inventors: Chih-Chieh Liu, Vernon Hills, IL (US); Jian Zhou, Vernon Hills, IL (US); Qiulin Tang, Vernon Hills, IL (US); Liang Cai, Vernon Hills, IL (US); Zhou Yu, Vernon Hills, IL (US)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 222 days.

(21) Appl. No.: 18/448,773

(22) Filed: Aug. 11, 2023

(65) Prior Publication Data

US 2024/0062371 A1　　Feb. 22, 2024

Related U.S. Application Data

(60) Provisional application No. 63/371,813, filed on Aug. 18, 2022.

(51) Int. Cl.
*G06T 7/00* 　　　　(2017.01)
*G06T 7/11* 　　　　(2017.01)

(52) U.S. Cl.
CPC .............. *G06T 7/0012* (2013.01); *G06T 7/11* (2017.01); *G06T 2200/04* (2013.01);
(Continued)

(58) Field of Classification Search
CPC . G06T 2207/20084; G06T 2207/20081; G06T 7/0012; G06T 11/00;
(Continued)

(56) References Cited

U.S. PATENT DOCUMENTS 11,475,278 B2 * 10/2022 Oliveira Ferreira ...... G06T 7/20
2021/0397886 A1 * 12/2021 Chen ..................... G06V 10/82
(Continued)

FOREIGN PATENT DOCUMENTS

CN　　110969633 A　　4/2020
CN　　112288752 A　　1/2021
WO　　2020/263002 A1　　12/2020

*Primary Examiner* — Xuemei G Chen
*Assistant Examiner* — Courtney Joan Nelson
(74) *Attorney, Agent, or Firm* — Oblon, McClelland, Maier & Neustadt, L.L.P.

(57)　　　　ABSTRACT

An apparatus is provided with processing circuitry that receives a phase image acquired at a corresponding cardiac phase, determines, from the received phase image, a mask image of a particular cardiac region, applies both the determined mask image and the phase image to inputs of a trained neural network model to obtain, from outputs of the neural network model, a location probability map. The neural network model is trained with a set of input data and a corresponding set of output data. The input data includes a training mask image and a training phase image, and the output data includes a training location probability map. The processing circuitry calculates, for the cardiac phase, from the determined location probability map output from the trained neural network model, a value of a cardiac motion metric. The determined location probability map specifies a probable location of a cardiac vessel.

20 Claims, 10 Drawing Sheets

(52) U.S. Cl.
CPC ............... *G06T 2207/20084* (2013.01); *G06T 2207/30048* (2013.01); *G06T 2207/30101* (2013.01)

(58) Field of Classification Search
CPC ......... G06T 2207/30101; G06T 3/4046; G06T 2200/04; G06T 2207/30048; G06T 2207/30004; G06T 7/174; G06T 5/60; G06T 7/143; G06T 7/11; G06V 10/82; G06V 10/764; G06V 20/64; G06V 10/806; G06V 2201/03; G06V 10/25; G06N 3/045; G06N 20/00; G06N 3/02; G16H 50/20; G16H 30/40; G16H 30/20; A61B 6/5217; A61B 1/000094; A61B 1/000096; A61B 2576/00
See application file for complete search history.

(56) References Cited

U.S. PATENT DOCUMENTS

2022/0082647 A1* 3/2022 Sharma .............. G01R 33/5608
2022/0092771 A1* 3/2022 Itu ......................... G06T 7/0012

* cited by examiner

FIG. 1

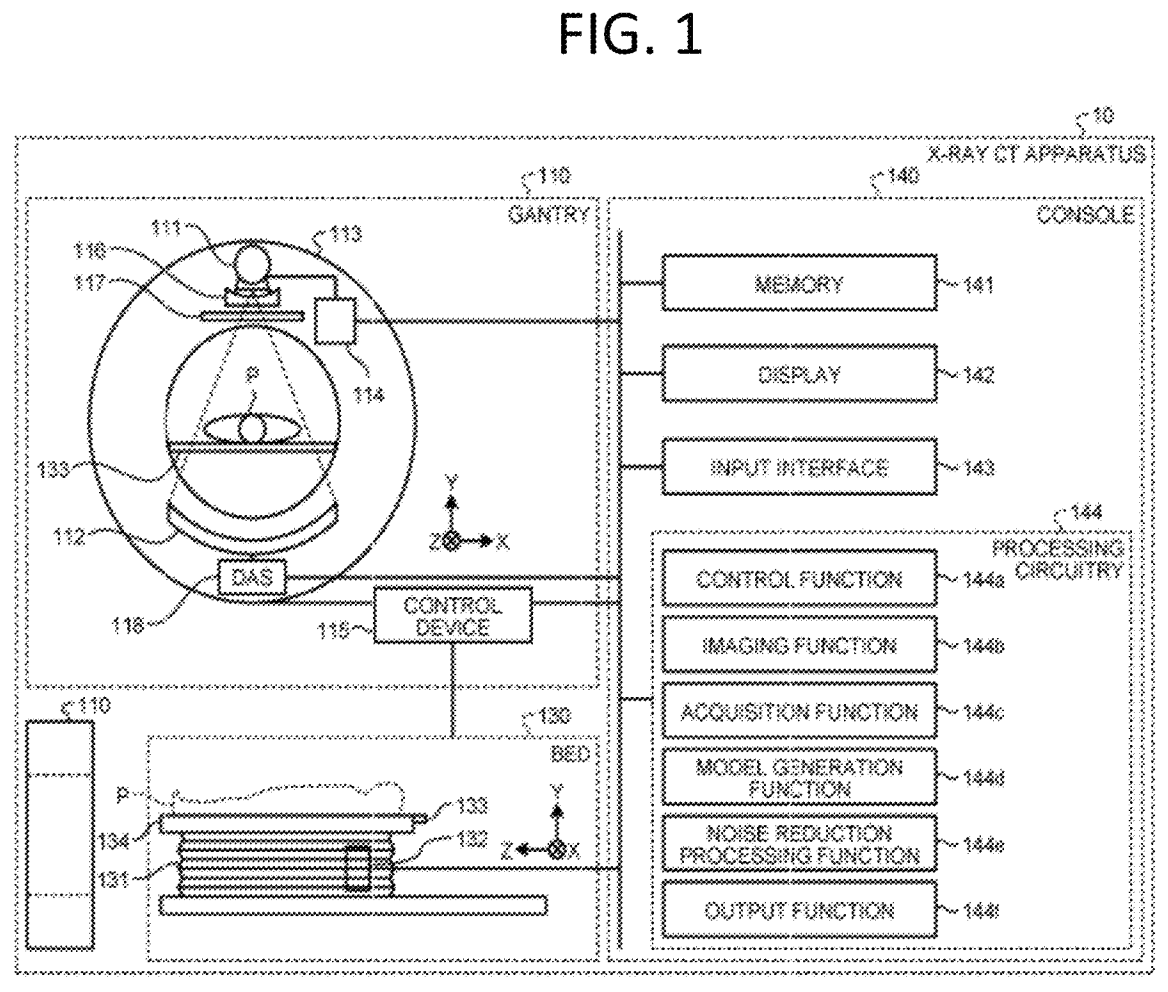

X-RAY CT APPARATUS 10

CONSOLE 140

MEMORY 141

DISPLAY 142

INPUT INTERFACE 143

PROCESSING CIRCUITRY 144

CONTROL FUNCTION 144a

IMAGING FUNCTION 144b

ACQUISITION FUNCTION 144c

MODEL GENERATION FUNCTION 144d

NOISE REDUCTION PROCESSING FUNCTION 144e

OUTPUT FUNCTION 144f

GANTRY 110

CONTROL DEVICE 115

DAS 118

BED 130

INFORMATION PROCESSING METHOD, MEDICAL IMAGE DIAGNOSTIC APPARATUS, AND INFORMATION PROCESSING SYSTEM INCLUDING DEEP LEARNING FOR OPTIMAL CARDIAC PHASE SELECTION

CROSS-REFERENCE TO RELATED APPLICATIONS

This application claims the benefit of priority to provisional Application No. 63/371,813 filed Aug. 18, 2022, the entire contents of which are incorporated herein by reference.

FIELD

Embodiments described herein relate generally to an information processing method, a medical image diagnostic apparatus, and an information processing system.

BACKGROUND

A medical image (e.g., a cardiac image) acquired from a subject by a medical image diagnostic apparatus (e.g., an X-ray computed tomography (CT) apparatus) may include motion which can detract from image quality. Moreover, motion in coronary CT angiography (CCTA) tends to be rapid and non-uniform deformation occurs between individuals.

Coronary computed tomography angiography (CCTA) imaging is a non-invasive exam and clinically essential for the evaluation of stenoses and atherosclerotic plaque without invasive medical intervention. The retrospective scan is one of commonly used protocols in CCTA to capture cardiac volume and function. With retrospective ECG-gated acquisition, R-waves are automatically detected, and images can be reconstructed at any different time intervals throughout the entire cardiac cycle. To improve diagnostic accuracy, however, it is necessary to determine the most optimal reconstruction phase that has the best image quality with little or even no motion artifacts. There are two phases normally used in clinical routine for image reconstruction: the end-diastolic phase and the end-systolic phase, which correspond to approximately 45% and 75% of the R-R interval, respectively. While they are usually optimal in general, the two empirical choices do not always guarantee better image quality, and the actual optimal phase can vary greatly with heart rate between individuals.

SUMMARY

In one embodiment, an apparatus includes processing circuitry configured to receive a phase image acquired at a corresponding cardiac phase; determine, from the received phase image, a mask image of a particular cardiac region; apply both the determined mask image and the phase image to inputs of a trained neural network model to obtain, from outputs of the neural network model, a location probability map, the neural network model having been trained with a set of input training data and a corresponding set of output training data, wherein the input training data includes a training mask image and a training phase image, and the output training data includes a training location probability map; and calculate, for the cardiac phase, from the determined location probability map output from the trained neural network model, a value of a cardiac motion metric, wherein the determined location probability map specifies a probable location of a cardiac vessel.

In another embodiment, a method includes receiving a phase image acquired at a corresponding cardiac phase; determining, from the received phase image, a mask image of a particular cardiac region; applying both the determined mask image and the phase image to inputs of a trained neural network model to obtain, from outputs of the neural network model, a location probability map, the neural network model having been trained with a set of input training data and a corresponding set of output training data, wherein the input training data includes a training mask image and a training phase image, and the output training data includes a training location probability map; and calculating, for the cardiac phase, from the determined location probability map output from the trained neural network model, a value of a cardiac motion metric, wherein the determined location probability map specifies a probable location of a cardiac vessel.

In another embodiment, a non-transitory computer-readable medium stores a program that, when executed by processing circuitry, causes the processing circuitry to perform a method that can include receiving a phase image acquired at a corresponding cardiac phase; determining, from the received phase image, a mask image of a particular cardiac region; applying both the determined mask image and the phase image to inputs of a trained neural network model to obtain, from outputs of the neural network model, a location probability map, the neural network model having been trained with a set of input training data and a corresponding set of output training data, wherein the input training data includes a training mask image and a training phase image, and the output training data includes a training location probability map; and calculating, for the cardiac phase, from the determined location probability map output from the trained neural network model, a value of a cardiac motion metric, wherein the determined location probability map specifies a probable location of a cardiac vessel.

The foregoing general description of the illustrative embodiments and the following detailed description thereof are merely exemplary aspects of the teachings of this disclosure, and are not restrictive.

BRIEF DESCRIPTION OF THE DRAWINGS

FIG. 1 is a block diagram of an exemplary configuration of an X-ray CT apparatus imaging a person as a subject according to an exemplary embodiment described herein.

DETAILED DESCRIPTION

Figure 2:
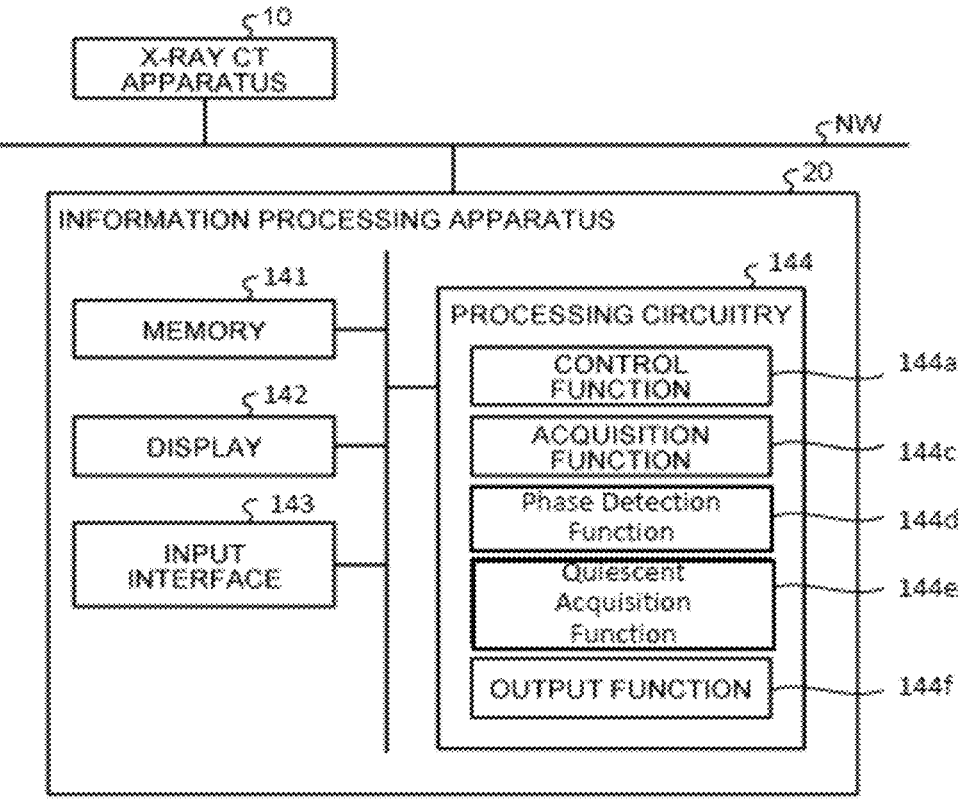
FIG. 2 is a block diagram of an exemplary configuration of information processing apparatus connected to an X-ray CT apparatus according to another exemplary embodiment described herein.

An information processing method of an embodiment is a method of controlling a CT scanner including, but not limited to, determining an X-ray irradiation period from an electrocardiogram acquired from an electrocardiography device attached to a living object to be imaged, by processing the electrocardiogram at multiple different cardiac phases; performing, by controlling a CT gantry including and rotatably supporting an X-ray source and an X-ray detector, a diagnostic CT scan in the determined X-ray irradiation period, of at least a part of the heart region, to obtain a CT image; and causing a display to display the obtained CT image.

The disclosure herein also describes an information processing apparatus including processing circuitry and/or computer instructions stored in a non-transitory computer readable storage medium for performing the above-noted method.

Hereinafter, with reference to the accompanying drawings, an embodiment of an information processing method, a medical image diagnostic apparatus, and an information processing system will be described in detail.

In the present embodiment, X-ray CT will be described as an example of a medical image diagnostic modality. That is, in the present embodiment, an information processing method of information acquired by imaging performed by the X-ray CT will be described.

The X-ray CT is implemented, for example, in an X-ray CT apparatus 10 illustrated in FIG. 1. FIG. 1 is a block diagram illustrating an example of a configuration of the X-ray CT apparatus 10 according to a first embodiment. For example, the X-ray CT apparatus 10 has a gantry 110, a bed 130, and a console 140.

In FIG. 1, it is assumed that the longitudinal direction of a rotating shaft of a rotating frame 113 or a tabletop 133 of the bed 130 in a non-tilted state is a Z axis direction. Furthermore, it is assumed that an axial direction orthogonal to the Z axis direction and horizontal to a floor surface is an X axis direction. Furthermore, it is assumed that an axial direction orthogonal to the Z axis direction and perpendicular to the floor surface is a Y axis direction. Note that FIG. 1 illustrates the gantry 110 drawn from a plurality of directions for convenience of description and the X-ray CT apparatus 10 has one gantry 110.

The gantry 110 includes an X-ray tube 111, an X-ray detector 112, the rotating frame 113, an X-ray high voltage device 114, a control device 115, a wedge 116, a collimator 117, and a data acquisition system (DAS) 118.

The X-ray tube 111 is a vacuum tube having a cathode (filament) that generates thermoelectrons and an anode (target) that generates X-rays in response to a collision of thermoelectrons. The X-ray tube 111 emits the thermoelectrons toward the anode from the cathode by the application of a high voltage from the X-ray high voltage device 114, thereby generating the X-rays to be emitted to a subject P.

The X-ray detector 112 detects the X-rays emitted from the X-ray tube 111 and passed through the subject P, and outputs a signal corresponding to the dose of the detected X-rays to the DAS 118. The X-ray detector 112, for example, includes a plurality of detection element arrays in which a plurality of detection elements are arranged in a channel direction (channel direction) along one arc centered on a focal point of the X-ray tube 111. The X-ray detector 112, for example, has a structure in which the detection element arrays with the detection elements arranged in the channel direction are arranged in a row direction (slice direction and row direction).

For example, the X-ray detector 112 is an indirect conversion type detector having a grid, a scintillator array, and a photosensor array. The scintillator array has a plurality of scintillators. Each of the scintillators has a scintillator crystal that outputs light with a photon quantity corresponding to an incident X-ray dose. The grid has an X-ray shielding plate that is disposed on the surface of the scintillator array on an X-ray incident side and absorbs scatted X-rays. The grid may also be referred to as a collimator (a one-dimensional collimator or a two-dimensional collimator). The photosensor array has a function of converting light into an electrical signal corresponding to the amount of light from the scintillator, and has, for example, photosensors such as photodiodes. Note that the X-ray detector 112 may be a direct conversion type detector having a semiconductor element that converts the incident X-rays into electrical signals.

The rotating frame 113 is an annular frame that supports the X-ray tube 111 and the X-ray detector 112 so as to face each other and rotates the X-ray tube 111 and the X-ray detector 112 by the control device 115. For example, the rotating frame 113 is a casting made of aluminum. Note that the rotating frame 113 can further support the X-ray high voltage device 114, the wedge 116, the collimator 117, the DAS 118 and the like, in addition to the X-ray tube 111 and the X-ray detector 112. Moreover, the rotating frame 113 can further support various configurations not illustrated in FIG. 1. Hereinafter, in the gantry 110, the rotating frame 113 and a part, which rotationally moves with the rotating frame 113, are also referred to as a rotating part.

The X-ray high voltage device 114 has electric circuitry such as a transformer and a rectifier and has a high voltage generation device that generates a high voltage to be applied to the X-ray tube 111 and an X-ray control device that controls an output voltage corresponding to the X-rays generated by the X-ray tube 111. The high voltage generation device may be a transformer type device or an inverter type device. Note that the X-ray high voltage device 114 may be provided on the rotating frame 113, or may also be provided on a fixed frame (not illustrated).

The control device 115 has processing circuitry having a central processing unit (CPU) and the like, and a driving mechanism such as a motor and an actuator. The control device 115 receives input signals from an input interface 143 and controls the operations of the gantry 110 and the bed 130. For example, the control device 115 controls the rotation of the rotating frame 113, the tilt of the gantry 110, the operation of the bed 130, and the like. As an example, as control for tilting the gantry 110, the control device 115 rotates the rotating frame 113 around an axis parallel to the X axis direction based on information on an input inclination angle (tilt angle). Note that the control device 115 may be provided in the gantry 110 or may also be provided in the console 140.

The wedge 116 is an X-ray filter for adjusting the dose of the X-rays emitted from the X-ray tube 111. Specifically, the wedge 116 is an X-ray filter that attenuates the X-rays emitted from the X-ray tube 111 such that the X-rays emitted from the X-ray tube 111 to the subject P have a predetermined distribution. For example, the wedge 116 is a wedge filter or a bow-tie filter and is manufactured by processing aluminum and the like to have a predetermined target angle and a predetermined thickness.

The collimator 117 is a lead plate and the like for narrowing down the emission range of the X-rays having transmitted through the wedge 116 and forms a slit by a combination of a plurality of lead plates and the like. Note that the collimator 117 may also be referred to as an X-ray diaphragm. Furthermore, although FIG. 1 illustrates a case where the wedge 116 is disposed between the X-ray tube 111 and the collimator 117, the collimator 117 may be disposed between the X-ray tube 111 and the wedge 116. In such a case, the wedge 116 attenuates the X-rays, which are emitted from the X-ray tube 111 and whose emission range is limited by the collimator 117, by allowing the X-rays to pass therethrough.

The DAS 118 acquires X-ray signals detected by each detector element included in the X-ray detector 112. For example, the DAS 118 has an amplifier that performs an amplification process on electrical signals output from each detector element and an A/D converter that converts the electrical signals to digital signals and generates detection data. The DAS 118 is implemented by, for example, a processor.

The data generated by the DAS 118 is transmitted from a transmitter having a light emitting diode (LED) provided on the rotating frame 113 to a receiver having a photodiode provided on a non-rotating part (for example, a fixed frame and the like and not illustrated in FIG. 1) of the gantry 110 by optical communication and is transmitted to the console 140. The non-rotating part is, for example, a fixed frame and the like that rotatably supports the rotating frame 113. Note that the data transmission method from the rotating frame 113 to the non-rotating part of the gantry 110 is not limited to the optical communication and may adopt any non-contact type data transmission method or a contact type data transmission method.

The bed 130 is a device that places and moves the subject P to be scanned and includes a pedestal 131, a couch driving device 132, the tabletop 133, and a support frame 134. The pedestal 131 is a casing that supports the support frame 134 so as to be movable in a vertical direction. The couch driving device 132 is a driving mechanism that moves the tabletop 133, on which the subject P is placed, in a long axis direction of the tabletop 133 and includes a motor, an actuator and the like. The tabletop 133 provided on the upper surface of the support frame 134 is a plate on which the subject P is placed. Note that the couch driving device 132 may also move the support frame 134 in the long axis direction of the tabletop 133 in addition to the tabletop 133.

The console 140 has a memory 141, a display 142, the input interface 143, and processing circuitry 144. Although the console 140 is described as a separate body from the gantry 110, the gantry 110 may include the console 140 or a part of each component of the console 140.

The memory 141 is implemented by, for example, a semiconductor memory element such as a random access memory (RAM) and a flash memory, a hard disk, an optical disk, and the like. For example, the memory 141 stores a computer program for circuitry included in the X-ray CT apparatus 10 to perform its functions. Furthermore, the memory 141 stores various information obtained by imaging the subject P. Furthermore, the memory 141 stores a noise reduction processing model generated by the processing circuitry 144 to be described below. Note that the memory 141 may be implemented by a server group (cloud) connected to the X-ray CT apparatus 10 via a network.

The display 142 displays various information. For example, the display 142 displays an image obtained during an identified quiescent period. Furthermore, for example, the display 142 displays a graphical user interface (GUI) for receiving various instructions, settings, and the like from a user via the input interface 143. For example, the display 142 is a liquid crystal display or a cathode ray tube (CRT) display. The display 142 may be a desktop type display, or may be composed of a tablet terminal and the like capable of wirelessly communicating with the body of the X-ray CT apparatus 10.

Although the X-ray CT apparatus 10 is described as including the display 142 in FIG. 1, the X-ray CT apparatus 10 may include a projector instead of or in addition to the display 142. Under the control of the processing circuitry 144, the projector can perform projection onto a screen, a wall, a floor, the body surface of the subject P, and the like. As an example, the projector can also perform projection onto any plane, object, space, and the like by projection mapping.

The input interface 143 receives various input operations from a user, converts the received input operations into electrical signals, and outputs the electrical signals to the processing circuitry 144. For example, the input interface 143 is implemented by a mouse, a keyboard, a trackball, a switch, a button, a joystick, a touch pad for performing an input operation by touching an operation surface, a touch screen in which a display screen and a touch pad are integrated, non-contact input circuitry using an optical sensor, voice input circuitry, and the like. Note that the input interface 143 may be composed of a tablet terminal and the like capable of wirelessly communicating with the body of the X-ray CT apparatus 10. Furthermore, the input interface 143 may be circuitry that receives an input operation from a user by motion capture. As an example, the input interface 143 can receive a user's body movement, line of sight, and the like as an input operation by processing a signal acquired via a tracker or an image collected for a user. Furthermore, the input interface 143 is not limited to one including physical operation parts such as a mouse and a keyboard. For example, an example of the input interface 143 includes electric signal processing circuitry which receives an electric signal corresponding to an input operation from an external input device separately provided from the X-ray CT apparatus 10 and outputs the electric signal to the processing circuitry 144.

The processing circuitry 144 controls the overall operation of the X-ray CT apparatus 10 by performing a control function 144a, an acquisition function 144c, a phase detection function 144d, a quiescent acquisition function 144e, and an output function 144f.

For example, the processing circuitry 144 reads a computer program corresponding to the control function 144a from the memory 141 and executes the read computer program, thereby controlling various functions, such as the acquisition function 144c, the phase detection function 144d, the quiescent acquisition function 144e, and the output function 144f, based on various input operations received from a user via the input interface 143.

Furthermore, for example, the processing circuitry 144 reads a computer program corresponding to the acquisition function 144c from the memory 141 and executes the read computer program, thereby acquiring noise data based on imaging a subject P and acquiring synthesized subject data based on first subject projection data obtained by imaging the subject P and combining with the noise data.

Furthermore, for example, the processing circuitry 144 reads a computer program corresponding to the phase imaging function 144d from the memory 141 and executes the read computer program, thereby imaging the subject P at each detected phase. For example, the cardiac phase is obtained from an R-R interval in an electrocardiogram. Then, the phase imaging function 144d controls the X-ray high voltage device 114 to supply the X-ray tube 111 with a high voltage. With this, the X-ray tube 111 generates X-rays to be emitted to the subject P. Furthermore, the phase imaging function 144d controls the couch driving device 132 to move the subject P into an imaging port of the gantry 110. Furthermore, the phase imaging function 144d adjusts the position of the wedge 116 and the opening degree and position of the collimator 117, thereby controlling the distribution of the X-rays emitted to the subject P. Furthermore, the phase imaging function 144d controls the control device 115 to rotate the rotating part. Furthermore, while the imaging is performed by the phase imaging function 144d, the DAS 118 acquires X-ray signals from the respective detection elements in the X-ray detector 112 and generates detection data.

Furthermore, the processing circuitry 144 reads a computer program corresponding to the quiescent acquisition function 144e from the memory 141 and executes the read computer program, thereby identifying the quiescent period among the phases detected in the phase imaging function 144d.

Furthermore, for example, the processing circuitry 144 reads a computer program corresponding to the output function 144f from the memory 141 and executes the read computer program, thereby outputting an image obtained during an identified quiescent period. Details of processing performed by the acquisition function 144c, and the output function 144f will be described below.

In the X-ray CT apparatus 10 illustrated in FIG. 1, the respective processing functions are stored in the memory 141 in the form of the computer programs executable by a computer. The processing circuitry 144 is a processor that performs a function corresponding to each computer program by reading and executing the computer program from the memory 141. In other words, the processing circuitry 144 having read the computer program has a function corresponding to the read computer program.

Note that, in FIG. 1, it has been described that the control function 144a, the acquisition function 144c, the phase detection function 144d, the quiescent acquisition function 144e, and the output function 144f are implemented by the single processing circuitry 144, but the processing circuitry 144 may be configured by combining a plurality of independent processors, and each processor may be configured to perform each function by executing each computer program. Furthermore, each processing function of the processing circuitry 144 may be performed by being appropriately distributed or integrated into a single circuit or a plurality of processing circuits.

Furthermore, the processing circuitry 144 may also perform the functions by using a processor of an external device connected via the network. For example, the processing circuitry 144 reads and executes the computer program corresponding to each function from the memory 141 and uses, as computation resources, a server group (cloud) connected to the X-ray CT apparatus 10 via the network, thereby performing each function illustrated in FIG. 1.

Furthermore, although FIG. 1 illustrates only the single memory 141, the X-ray CT apparatus 10 may include a plurality of physically separated memories. For example, the X-ray CT apparatus 10 may separately include, as the memory 141, a memory that stores a computer program required when circuitry included in the X-ray CT apparatus 10 performs its function, and a memory that stores various information obtained by imaging the subject P.

Hereinafter, this point will be described with reference to FIG. 2. FIG. 2 is a block diagram illustrating an example of a configuration of an information processing system 1 according to a second embodiment. For example, the information processing system 1 includes an X-ray CT apparatus 10 and an information processing apparatus 20 as illustrated in FIG. 2. The X-ray CT apparatus 10 and the information processing apparatus 20 are connected to each other via a network NW.

Note that the location where the X-ray CT apparatus 10 and the information processing apparatus 20 are installed is arbitrary as long as they can be connected via the network NW. For example, the X-ray CT apparatus 10 and the information processing apparatus 20 may be installed within facilities different from each other. That is, the network NW may be a local network closed within the facility or a network via the Internet. Furthermore, communication between the X-ray CT apparatus 10 and the information processing apparatus 20 may be performed via another apparatus such as an image storage apparatus, or may be directly performed without using another apparatus. An example of such an image storage apparatus includes a picture archiving and communication system (PACS) server, for example.

The X-ray CT apparatus 10 illustrated in FIG. 2 has the same configuration as that of the X-ray CT apparatus 10 illustrated in FIG. 1. However, the processing circuitry 144 of the X-ray CT apparatus 10 illustrated in FIG. 2 may or may not have such functions as the acquisition function 144c and the output function 144f. Furthermore, although FIG. 2 illustrates the X-ray CT apparatus 10 as an example of a medical image diagnostic apparatus, the information processing system 1 may include a medical image diagnostic apparatus different from the X-ray CT apparatus 10. Furthermore, the information processing system 1 may include a plurality of medical image diagnostic apparatuses.

The information processing apparatus 20 performs various processes based on data acquired by the X-ray CT apparatus 10. For example, as illustrated in FIG. 2, the information processing apparatus 20 includes a memory 141, a display 142, an input interface 143, and processing circuitry 144. The display 142 can be configured similarly to the aforementioned display 142 in the apparatus 10. The information processing apparatus 20 may include a projector instead of or in addition to the display 142.

The input interface 143 can be configured similarly to the aforementioned input interface 143 of the X-ray CT apparatus 10. For example, the input interface 143 receives various input operations from a user, converts the received input operations into electrical signals, and outputs the electrical signals to the processing circuitry 144.

The processing circuitry 144 controls the overall operation of the information processing apparatus 20 by performing a control function 144a, an acquisition function 144c, and an output function 144f For example, the control function 144a controls various functions such as the acquisition function 144c and the output function 144f based on the various input operations received from the user via the input interface 143. The acquisition function 144c is a function corresponding to the acquisition function 144c of the X-ray CT apparatus 10. The output function 144*f* is a function corresponding to the output function 144*f* of the X-ray CT apparatus 10.

In the information processing apparatus 20 illustrated in FIG. 2, respective processing functions are stored in the memory 141 in the form of computer programs that can be executed by a computer. The processing circuitry 144 is a processor that reads and executes the computer programs from the memory 141, thereby performing functions corresponding to the computer programs. In other words, the processing circuitry 144 having read the computer programs has the functions corresponding to the read computer programs. Furthermore, each processing function of the processing circuitry 144 may be performed by being appropriately distributed or integrated into a single processing circuit or a plurality of processing circuits. Furthermore, the processing circuitry 144 may also perform the functions by using a processor of an external device connected via the network NW. For example, the processing circuitry 144 reads and executes the computer programs corresponding to the functions from the memory 141 and uses, as computation resources, a server group (cloud) connected to the information processing apparatus 20 via the network NW, thereby performing the functions illustrated in FIG. 2.

Furthermore, in FIG. 1, it has been described that the single memory 141 stores the computer programs corresponding to the respective processing functions of the processing circuitry 144. Furthermore, in FIG. 2, it has been described that the single memory 144 stores the computer programs corresponding to the respective processing functions of the processing circuitry 144. However, the embodiment is not limited thereto. For example, a plurality of memories 141 may be arranged in a distributed manner, and the processing circuitry 144 may be configured to read corresponding computer programs from the individual memories 141. Furthermore, instead of storing the computer programs in the memory 141, the computer programs may be directly incorporated in the circuit of the processor. In such a case, the processor reads and executes the computer programs incorporated in the circuit to perform functions thereof.

Each component of each apparatus according to the aforementioned embodiment is functionally conceptual and does not necessarily need to be physically configured as illustrated in the drawings. That is, the specific form of distribution and integration of each apparatus is not limited to that illustrated in the drawing and all or some thereof can be functionally or physically distributed and integrated in arbitrary units according to various loads, usage conditions, and the like. Moreover, all or some of the processing functions performed by each apparatus may be performed by the CPU and the computer programs that are analyzed and executed by the CPU, or may be performed as a wired logic-based hardware.

Furthermore, the information processing method described in the aforementioned embodiment can be implemented by executing an information processing program prepared in advance on a computer such as a personal computer and a workstation. The information processing program can be distributed via a network such as the Internet. Furthermore, the information processing program can be executed by being recorded on a non-transitory computer readable recording medium such as a hard disk, a flexible disk (FD), a CD-ROM, an MO, and a DVD, and being read from the recording medium by the computer.

The most straightforward optimal phase selection is to manually evaluate reconstructions of all available time points within the R-R interval. Clearly, this process can be time consuming, and thus advanced algorithms are highly demanded in this scenario to quickly and automatically predict the best phase based on motion with, or even without, actual image reconstruction. Early attempts have been made in which an optimal phase is chosen by analyzing the quality of main vessels (such as right coronary artery (RCA), left anterior descending artery (LAD), and left circumflex (LCX) coronary artery) based on a set of 2D axial images. Here each axial image is a specific transverse plane reconstructed at a specific cardiac phase. These methods assume that the vessels travel longitudinally through the plane, and hence the vessel cross sections become circular in the absence of cardiac motion. Main vessels have to be segmented out from each image and the quality can be scored by measuring the circularity and edge strength of the vessel cross sections. However, there are a couple of challenges associated with this method. First, to precisely find the main vessels in each phase image, the non-cardiac region has to be removed. The proposed background removal is heavily dependent on a patient-specific thresholding method, which does not work when large motion artifacts are present in the vessel or when the vessel is too close to the cardiac chamber. In addition, there is no mechanism to differentiate vessel-like artificial objects (such as a stent) from the vessels of interest. These non-vessel objects can cause bias in phase selection if they are accidently involved in the quality metric evaluation.

To mitigate these disadvantages, a deep learning-based method helps better localize the vessels in each axial image, without the need of heavy image segmentation or background removal. More specifically, deep convolutional neural networks have been developed to fulfill this purpose. The RCA is the main vessel of interest for quality analysis, but extensions to LAD and LCX are straightforward.

Figure 3:
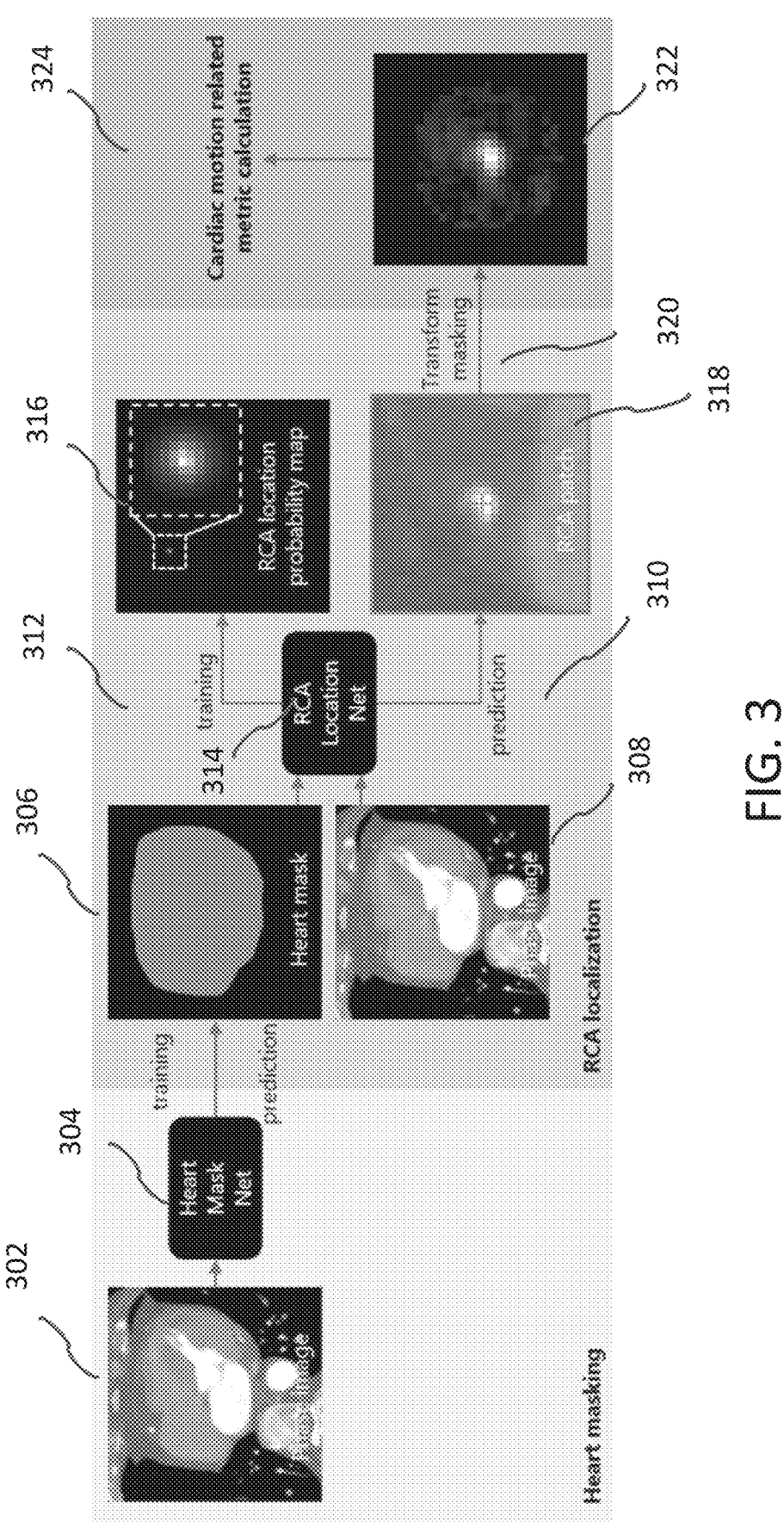
FIG. 3 is a workflow of the disclosed algorithm including heart masking, RCA localization, and calculation of the motion metric according to an exemplary embodiment described herein.

The workflow of the algorithm for optimal phase selection is shown in FIG. 3. In order to better localize the RCA while eliminating vessel-like objects outside heart, the heart region is segmented first. A neural network (the heart segmentation network 304) has been trained to take as input a phase image 302 and output a binary heart mask 306. In one embodiment, the phase image is a two-dimensional axial image of the heart acquired at a cardiac phase. In one embodiment, the phase image is a three-dimensional image of the heart acquired at the cardiac phase. In one embodiment, the neural network 304 receives the cardiac phase corresponding to the acquired phase image, the cardiac phase being obtained from an R-R interval in an electrocardiogram. The RR interval is the time elapsed between two successive R waves of the QRS signal on the electrocardiogram (and its reciprocal, the HR). The generated mask 306 is then combined with the original image 308, forming a 2-channel image.

A trained RCA localization network 314 takes as input this 2-channel image and predicts the location of the RCA. Here, instead of generating the location coordinate directly, the network 314 is trained to infer a location probability map 316 that indicates how close each pixel on the image is to the desired RCA location. The probability assigned to each pixel in training is calculated using the formula below:

$$Prob(x) = \begin{cases} e^{-\frac{d(x)}{d_{max}}}, & d(x) < d_{max}, \\ 0 & \text{otherwise} \end{cases}$$

where d(x) is the distance between the pixel x and the RCA location, and $d_{max}$ is a distance threshold (e.g., 1.0 cm).

Figure 4:
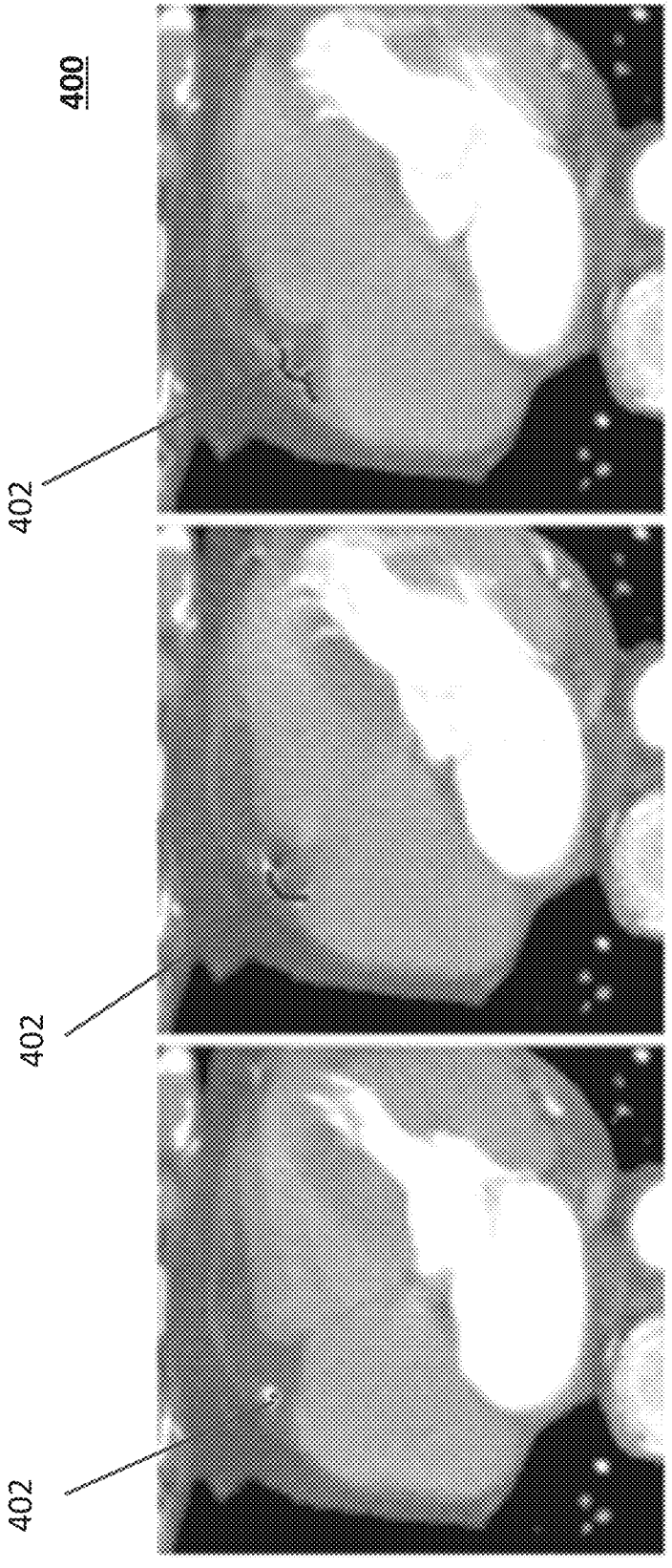
FIG. 4. illustrates three representative delineations of the RCA labeled in black asterisks according to an exemplary embodiment described herein.

When the cardiac motion is mild, the RCA cross section normally appears circular, so one can simply select the center of the cross section as the desired RCA location. When the motion is large, the shape of cross section can be severely distorted, leading to motion artifacts. In this case, multiple candidate locations are traced and sampled along the artifact. The probability of each pixel is then calculated based on the shortest distance between the pixel and all candidates. FIG. 4 show several examples of selecting the locations when the cardiac motion artifacts are present. As shown in FIG. 4, three representative delineations of the RCA are labeled in black asterisks 402 in images 400.

Once the location probability map 316 is predicted by the RCA localization network 314, the pixel with highest probability is chosen as the final RCA location. A small patch 318 having a size of 3 cm×3 cm (for example) centered at that location is then cropped out, which will be used to evaluate the motion strength. Before evaluation, the top-hat transform or other matched filtering 320 is also applied on the patch to remove the background, while preserving the shape of vessel cross section. Then, a cardiac motion metric, such as the (normalized) entropy, is calculated 324 within a circular mask 322 of radius of 1 cm (for example) as the final figure of merit. The entropy is a measure of the image sharpness or blurriness. Smaller entropy means sharper image as well as fewer motion artifacts.

Finally, a particular cardiac phase, of the plurality of cardiac phases, is determined from the determined plurality of values of the cardiac motion metric, the particular cardiac phase having a corresponding value of the cardiac motion metric that is greatest or least among the values of the cardiac motion metric. In one embodiment, a particular cardiac phase among cardiac phases is determined as the cardiac phase having the minimal entropy. In one embodiment, a particular phase image is output corresponding to the selected cardiac phase.

The heart segmentation network and the RCA localization network share similar architecture 500. A residual network (ResNet) structure has been adopted in both networks shown in FIGS. 5A, 5B, and 5C.

Figure 5A:
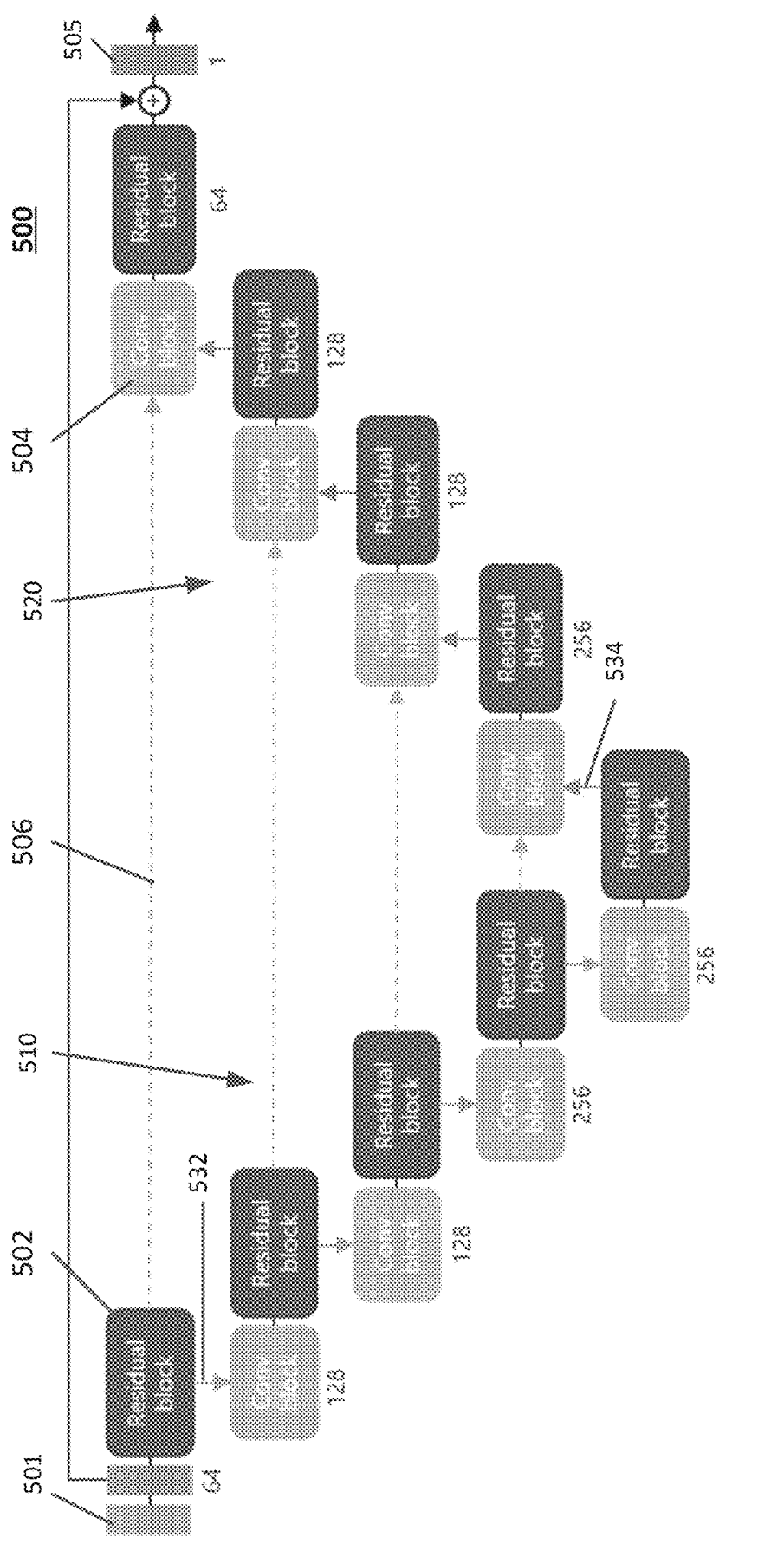
FIGS. 5A, 5B, and 5C illustrate a ResNet-based network structure according to an exemplary embodiment described herein.
Figure 5C:
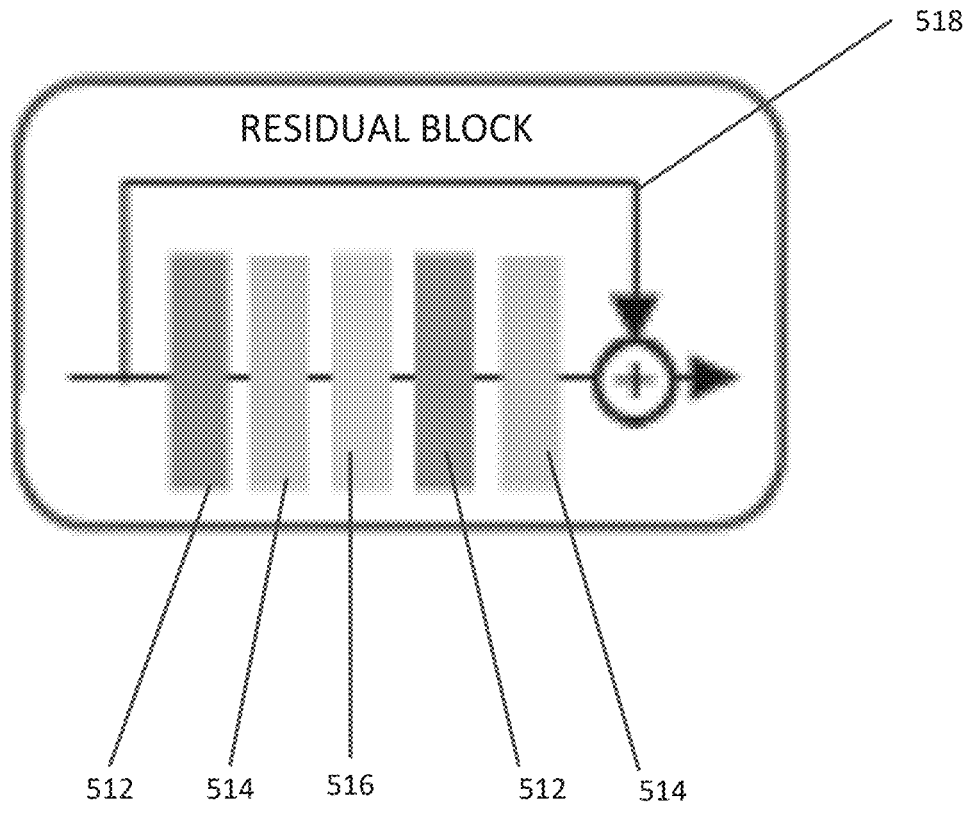
Figure 5B:
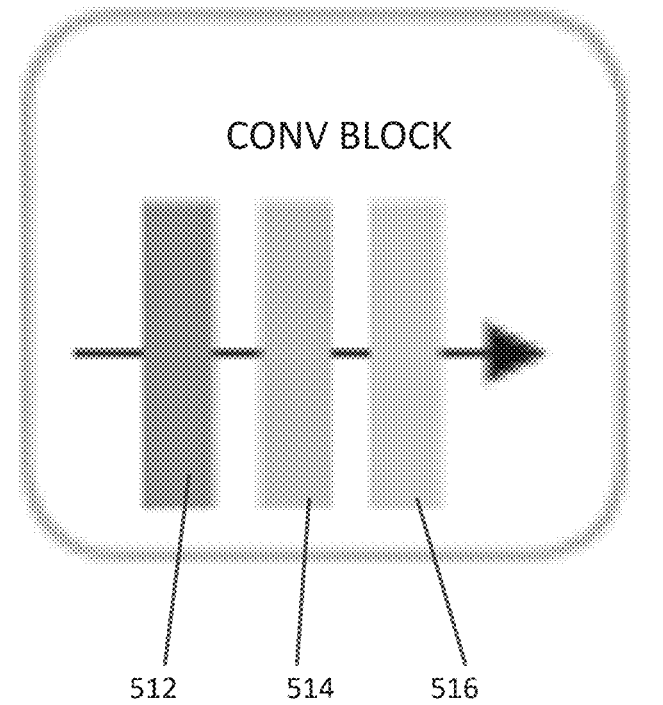

FIG. 5A is a diagram of the overall residual network 500. FIG. 5B is a detailed diagram of the convolutional block 504. FIG. 5C is a detailed diagram of the residual block 502. The network 500 has an input image 501 and an output image 505. The residual block 502 is built by one convolutional layer 512 (Conv2D, 3×3 kernel size) followed by a batch normalization layer 514 (BN) and an activation layer rectified linear unit 516 (ReLU) and the other convolutional layer 512 followed by a BN 514. The residual block 502 includes a skip connection 518. The BN 514 is also added after each Conv2D 512 in the convolutional block 504 in the encoding 510 and decoding 520 blocks to increase the learning capability and accelerate the training convergence. The root feature of both networks is set to 64, for example. The residual network 500 has skip connections 506. In the encoding block 510, max pooling 532 is performed between layers, while in the decoding clock 510, up-sampling 534 is performed between layers.

In one embodiment, the training data were prepared from 114 independent CCTA cases. For each case, phase images were generated using the central axial image reconstruction for every 1% increment of the R-R interval, i.e., a total 100 phase images can be obtained if the data acquired is available in a complete cardiac cycle. The display field of view is set to 240 mm, and the image matrix size is 256×256, in one example. The datasets were divided into 112 for training and 2 for validation. As a result, 4,732 and 83 phase image slices were used for training and validation, respectively. The training data were augmented on-the-fly during training using random rotation between±45° and intensity scaling ranging from 0.7 to 1.1. A total of 800 epochs with batch size equal to 16 were used in the training. The dice loss was used to train the heart segmentation network, and the mean-squared error (MSE) was used to train the RCA localization network 312. All trainings are end-to-end, and the Adam optimizer was used with the initial learning rate of $10^{-3}$, which decays 50% at every 50 epochs after the first 350 epochs. In an exemplary implementation, the training 312 and prediction 310 were all implemented using PyTorch on a NVIDIA Titan RTX GPU.

Figure 6:
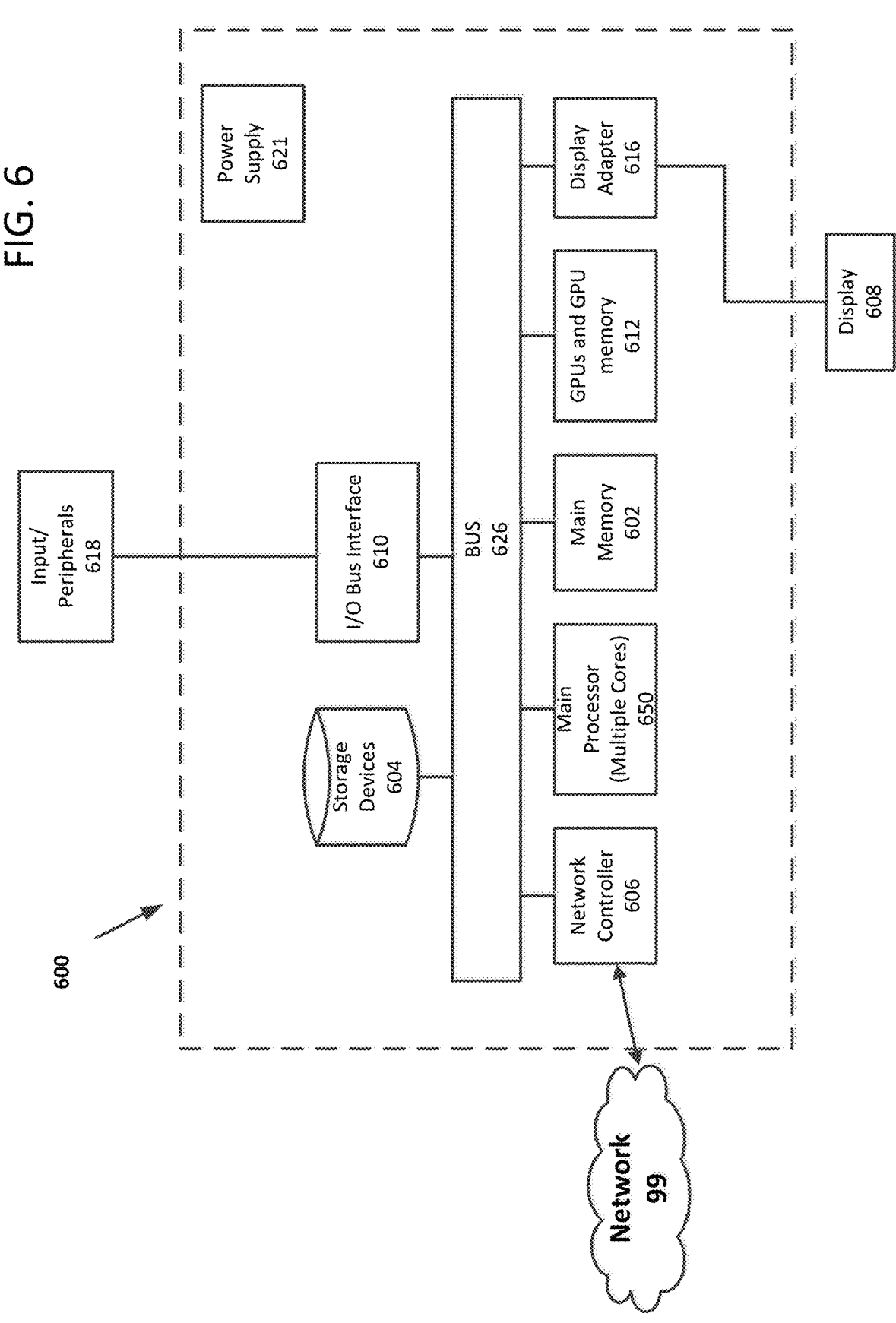
FIG. 6 is a block diagram of an apparatus used for training.

FIG. 6 is a block diagram of an apparatus used for implementing the machine learning training and inference methods according to an exemplary aspect of the disclosure. The apparatus may be an AI workstation running an operating system, for example Ubuntu Linux OS, Windows, a version of Unix OS, or Mac OS. The apparatus 600 may include one or more central processing units (CPU) 650 having multiple cores. The apparatus 600 may include a graphics board 612 having multiple GPUs, each GPU having GPU memory. The graphics board 612 may perform many of the mathematical operations of the disclosed machine learning methods. The apparatus 600 includes main memory 602, typically random access memory RAM, which contains the software being executed by the processing cores 650 and GPUs 612, as well as a non-volatile storage device 604 for storing data and the software programs. Several interfaces for interacting with the apparatus 600 may be provided, including an I/O Bus Interface 610, Input/Peripherals 618 such as a keyboard, touch pad, mouse, Display Adapter 616 and one or more Displays 608, and a Network Controller 606 to enable wired or wireless communication through a network 99. The interfaces, memory and processors may communicate over the system bus 626. The apparatus 600 includes a power supply 621, which may be a redundant power supply.

In some embodiments, the apparatus 600 may include a CPU and a graphics card by NVIDIA, in which the GPUs have multiple CUDA cores.

Figure 7A:
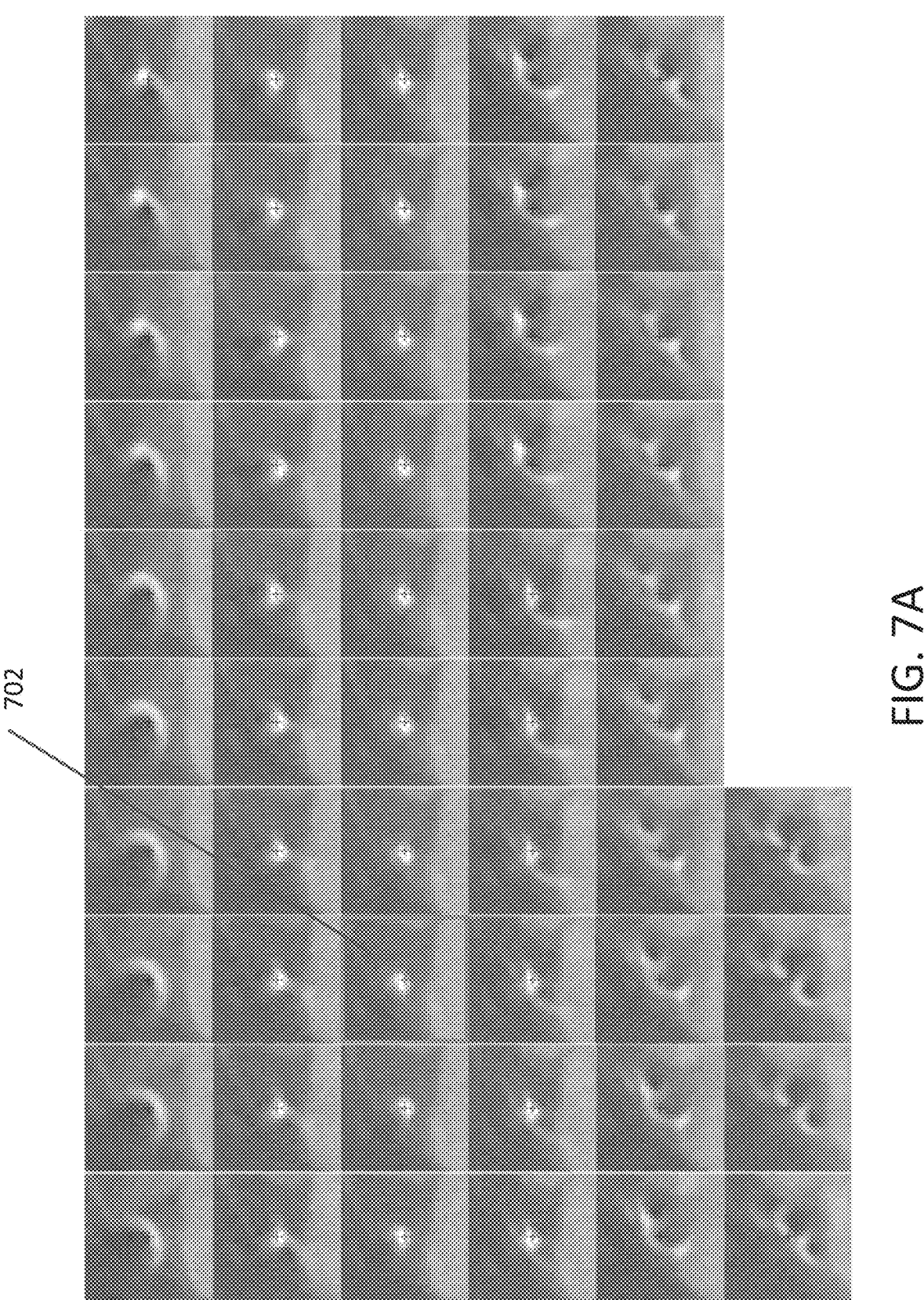
FIG. 7A illustrates a total of 54 phase images (28%-81%) with the predicted RCA locations labeled as a black cross and FIG. 7B illustrates the entropy curve as a function of cardiac phase.
Figure 7B:
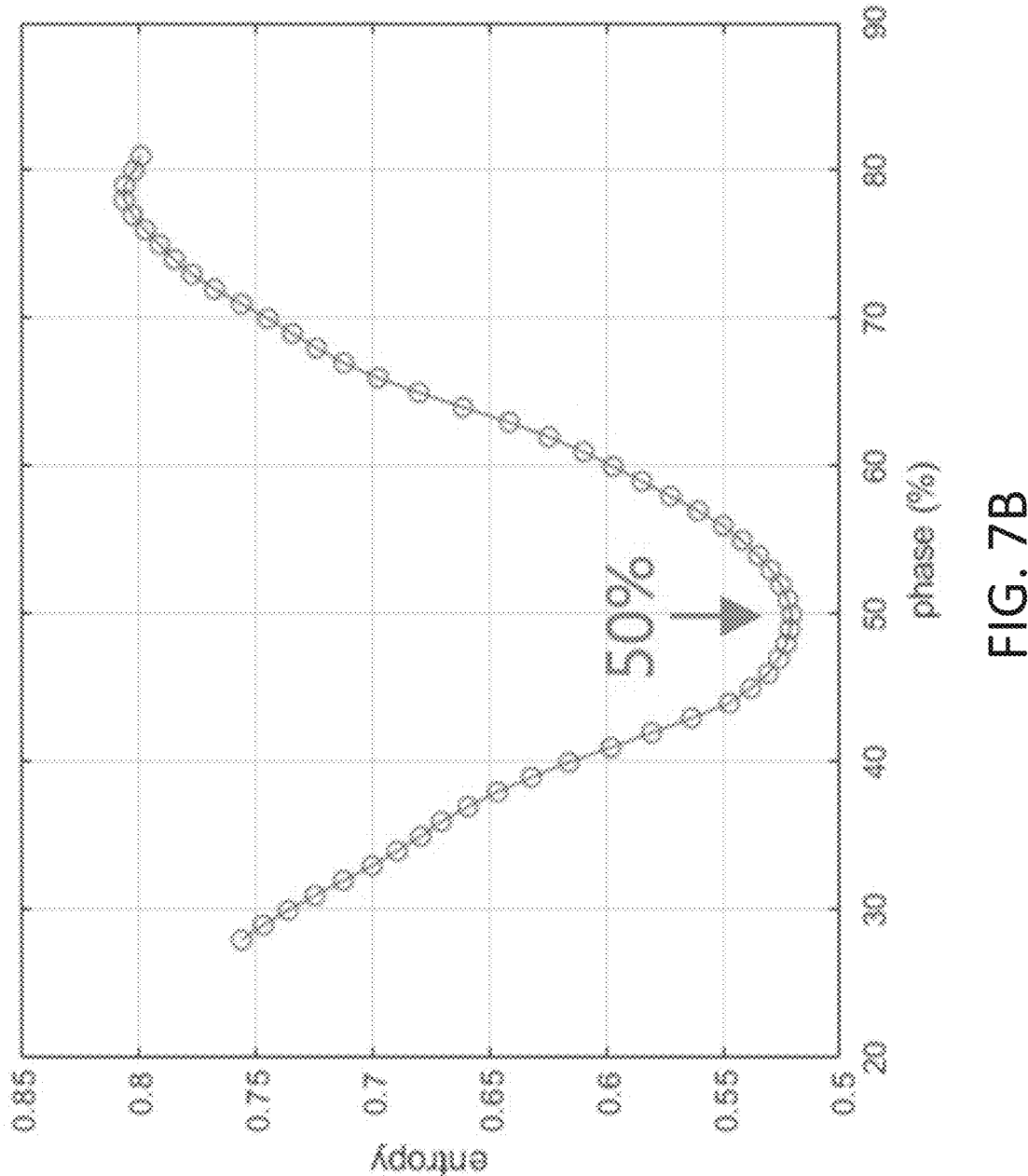

The predicted RCA locations on the phase images of an exemplary case and the normalized entropy curve are shown in FIGS. 7A and 7B, respectively. As shown in FIG. 7A, a total of 54 phase images (28%-81%) are displayed with the predicted RCA locations labeled as a cross. FIG. 7B shows the entropy curve as a function of cardiac phase. The phase image at the phase of 50% is shown in box 702. These phase images are from a patient with a heart rate of 74 bpm.

As can be seen in those figures, even if there are large motion artifacts, the algorithm can accurately generate a location which is aligned well with the underlying RCA cross section on each phase image. The entropy is then calculated for each image using the algorithm, and plotted out as a function of phase intervals (see FIG. 7B). For this exemplary case, the optimal phase is at the 50% (702) of the R-R interval, which is well correlated with the circular shape of RCA cross section shown in FIG. 7A. For better visualization, three image volumes at 45%, 75% and 50%, respectively, are reconstructed.

Figures 8A, 8B, 8C:
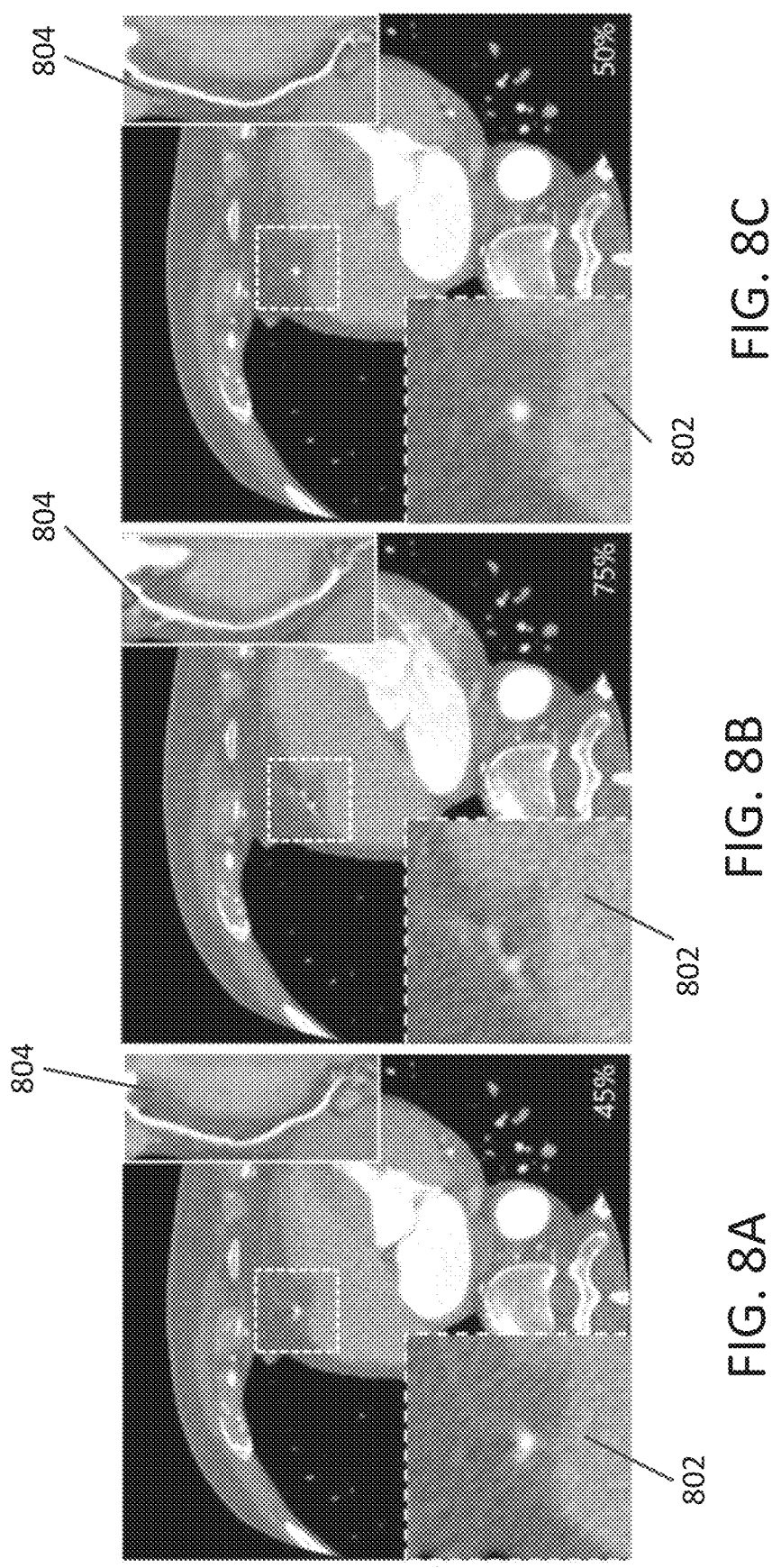
FIGS. 8A, 8B, and 8C illustrate three reconstructed images at the standard phases of 45% (FIG. 8A) and 75% (FIG. 8B) and at the phase of 50% (FIG. 8C) using the disclosed algorithm.

FIGS. 8A, 8B, and 8C show a transverse slice across the RCA. The three reconstructed images at the standard phases of 45% (FIG. 8A) and 75% (FIG. 8B) and at the phase of 50% (FIG. 8C) using the algorithm. The inlets on the bottom left 802 are the RCA cross sections, and the inlets on the top right 804 show the CPR images of RCA. Clearly, from both the cross sections and the curved projection reformation

13

(CPR) images of RCA, it can be seen that the selected phase is the best with almost motion-free RCA reconstruction.

The algorithm provides accurate RCA location for efficient and cardiac motion related quiescent phase detection in the image domain. Although the standard phases of 45% and 75% are often used in clinical practice, they are not directly correlated to the cardiac motion and may result in motion artifact in the reconstructed images, especially from the patients with high heart rate or irregular cardiac rhythm. The algorithm can also be extended to 3D volumetric data when the exact motion artifact level from the whole RCA needs to be considered for consistent image quality across the image slices.

The term "processor" or "processing circuitry" used in the above description, for example, means a circuit such as a CPU, a graphics processing unit (GPU), an application specific integrated circuit (ASIC), and a programmable logic device (for example, a simple programmable logic device (SPLD), a complex programmable logic device (CPLD), and a field programmable gate array (FPGA)). When the processor is, for example, the CPU, the processor performs functions by reading and executing computer programs stored in a storage circuit. On the other hand, when the processor is, for example, the ASIC, the functions are directly incorporated in the circuit of the processor as a logic circuit instead of storing the computer programs in the storage circuit. Note that each processor of the embodiment is not limited to a case where each processor is configured as a single circuit, and one processor may be configured by combining a plurality of independent circuits to perform functions thereof. Moreover, a plurality of components in each drawing may be integrated into one processor to perform functions thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In addition to the embodiments described above, additional embodiments are described in the parentheticals set forth below.

(1) An apparatus, including, but not limited to: processing circuitry configured to receive a phase image acquired at a corresponding cardiac phase; determine, from the received phase image, a mask image of a particular cardiac region; apply both the determined mask image and the phase image to inputs of a trained neural network model to obtain, from outputs of the neural network model, a location probability map, the neural network model having been trained with a set of input training data and a corresponding set of output training data, wherein the input training data includes a training mask image and a training phase image, and the output training data includes a training location probability map; and calculate, for the cardiac phase, from the determined location probability map output from the trained neural network model, a value of a cardiac motion metric, wherein the determined location probability map specifies a probable location of a cardiac vessel.

(2) The apparatus according to (1), in which the processing circuitry is further configured to repeat performance of the receiving, determining, applying, and calculating for a plurality of cardiac phases to determine a corresponding plurality of values of the cardiac motion metric; and determine, from the determined plurality of values of the cardiac motion metric, a particular cardiac phase, of the plurality of cardiac phases, having a corresponding value of the cardiac motion metric that is greatest or least among the plurality of values of the cardiac motion metric.

(3) The apparatus according to (1) or (2), in which, in the receiving step, the processing circuitry is further configured to receive, as the phase image, a two-dimensional axial image of the heart acquired at the cardiac phase.

(4) The apparatus according to and one of (1)-(3), in which, in the receiving step, the processing circuitry is further configured to receive, as the phase image, a three-dimensional image of the heart acquired at the cardiac phase.

(5) The apparatus according to any one of (1)-(4), in which, in determining the mask image, the processing circuitry is further configured to apply the phase image to inputs of a trained mask neural network model to obtain, from outputs of the trained mask neural network model the mask image of the particular cardiac region.

(6) The apparatus according to any one of (1)-(5), in which the processing circuitry is further configured to apply the determined mask image and the phase image to the inputs of the trained neural network model that was trained with the output training data, which includes the training location probability map, wherein each element in the training location probability map is assigned a value according to a predetermined function of a distance between the element and a predetermined element in the training location probability map.

(7) The apparatus according to (6), in which each element in the training location probability map is assigned the value according to the function of the distance between the element and the predetermined element in the training location probability map, the predetermined element is a center of a cross section of an artery, and the predetermined function is a decreasing function of a ratio of the distance and a predetermined distance when the distance is less than the predetermined distance, and zero otherwise.

(8) The apparatus according to any one of (1)-(7), in which in calculating the value of the cardiac motion metric, the processing circuitry is further configured to: determine a particular element in the location probability map having a highest probability, extract, from the phase image, a region of a predetermined size having the particular element as a center, transform the extracted region to remove background portions and generate a transformed region, and calculate, as the value of the cardiac motion metric, based on the transformed region, an entropy value calculated within a circular mask of a predetermined radius.

(9) The apparatus according to any one of (1)-(8), in which the processing circuitry is further configured to receive the cardiac phase corresponding to the acquired phase image, the cardiac phase being obtained from an R-R interval in an electrocardiogram.

(10) The apparatus according to (3), in which, in the applying step, the processing circuitry is further configured to obtain the location probability map, which specifies the probable location of a right coronary artery.

(11) The apparatus according to (2), in which the cardiac motion metric is entropy, the processing circuitry is further configured to determine the particular cardiac phase, of the plurality of cardiac phases, having a minimal entropy, and the processing circuitry is further configured to output a particular phase image corresponding to the determined particular cardiac phase.

(12) A method, including, but not limited to receiving a phase image acquired at a corresponding cardiac phase; determining, from the received phase image, a mask image of a particular cardiac region; applying both the determined mask image and the phase image to inputs of a trained neural network model to obtain, from outputs of the neural network model, a location probability map, the neural network model having been trained with a set of input training data and a corresponding set of output training data, wherein the input training data includes a training mask image and a training phase image, and the output training data includes a training location probability map; and calculating, for the cardiac phase, from the determined location probability map output from the trained neural network model, a value of a cardiac motion metric, wherein the determined location probability map specifies a probable location of a cardiac vessel.

(13) The method according to (12), further including repeating the receiving, determining, applying, and calculating steps for a plurality of cardiac phases to determine a corresponding plurality of values of the cardiac motion metric; and determining, from the determined plurality of values of the cardiac motion metric, a particular cardiac phase, of the plurality of cardiac phases, having a corresponding value of the cardiac motion metric that is greatest or least among the plurality of values of the cardiac motion metric.

(14) The method according to (12) or (13), in which the receiving step further comprises receiving, as the phase image, a two-dimensional axial image of the heart acquired at the cardiac phase.

(15) The method according to any one of (12)-(14), the determining step further comprises applying the phase image to inputs of a trained mask neural network model to obtain, from outputs of the trained mask neural network model the mask image of the particular cardiac region.

(16) The method according to any one of (12)-(15), in which the trained neural network model was trained with the output training data, which includes the training location probability map, wherein each element in the training location probability map is assigned a value according to a predetermined function of a distance between the element and a predetermined element in the training location probability map.

(17) The method according to (16), in which each element in the training location probability map is assigned the value according to the function of the distance between the element and the predetermined element in the training location probability map, the predetermined element is a center of a cross section of an artery, and the predetermined function is a decreasing function of a ratio of the distance and a predetermined distance when the distance is less than the predetermined distance, and zero otherwise.

(18) The method according to any one of (12)-(17), in which the calculating step further includes determining a particular element in the location probability map having a highest probability, extracting, from the phase image, a region of a predetermined size having the particular element as a center, transforming the extracted region to remove background portions and generate a transformed region, and calculating, as the value of the cardiac motion metric, based on the transformed region, an entropy value calculated within a circular mask of a predetermined radius.

(19) The apparatus according to any one of (1)-(11), in which the processing circuitry is further configured to receive the cardiac phase corresponding to the acquired phase image, the cardiac phase being obtained from an R-R interval in an electrocardiogram.

(20) A non-transitory computer-readable medium storing a program that, when executed by processing circuitry, causes the processing circuitry to perform a method, including receiving a phase image acquired at a corresponding cardiac phase; determining, from the received phase image, a mask image of a particular cardiac region; applying both the determined mask image and the phase image to inputs of a trained neural network model to obtain, from outputs of the neural network model, a location probability map, the neural network model having been trained with a set of input training data and a corresponding set of output training data, wherein the input training data includes a training mask image and a training phase image, and the output training data includes a training location probability map; and calculating, for the cardiac phase, from the determined location probability map output from the trained neural network model, a value of a cardiac motion metric, wherein the determined location probability map specifies a probable location of a cardiac vessel.

The invention claimed is:

1. An apparatus, comprising:

processing circuitry configured to receive a phase image acquired at a corresponding cardiac phase;

determine, from the received phase image, a mask image of a particular cardiac region;

apply both the determined mask image and the phase image to inputs of a trained neural network model to obtain, from outputs of the trained neural network model, a location probability map, the trained neural network model having been trained with a set of input training data and a corresponding set of output training data, wherein the input training data includes a training mask image and a training phase image, and the output training data includes a training location probability map; and calculate, for the cardiac phase, from the determined location probability map output from the trained neural network model, a value of a cardiac motion metric, wherein the determined location probability map specifies a probable location of a cardiac vessel.

2. The apparatus of claim 1, wherein the processing circuitry is further configured to:

repeat performance of the receiving, determining, applying, and calculating for a plurality of cardiac phases to determine a corresponding plurality of values of the cardiac motion metric; and determine, from the determined plurality of values of the cardiac motion metric, a particular cardiac phase, of the plurality of cardiac phases, having a corresponding value of the cardiac motion metric that is greatest or least among the plurality of values of the cardiac motion metric.

3. The apparatus of claim 2, wherein the cardiac motion metric is entropy, the processing circuitry is further configured to determine the particular cardiac phase, of the plurality of cardiac phases, having a minimal entropy, and the processing circuitry is further configured to output a particular phase image corresponding to the determined particular cardiac phase.

4. The apparatus of claim 1, wherein, in the receiving step, the processing circuitry is further configured to receive, as the phase image, a two-dimensional axial image of a heart acquired at the cardiac phase.

5. The apparatus of claim 4, wherein, in the applying step, the processing circuitry is further configured to obtain the location probability map, which specifies the probable location of a right coronary artery.

6. The apparatus of claim 1, wherein, in the receiving step, the processing circuitry is further configured to receive, as the phase image, a three-dimensional image of a heart acquired at the cardiac phase.

7. The apparatus of claim 1, wherein, in determining the mask image, the processing circuitry is further configured to apply the phase image to inputs of a trained mask neural network model to obtain, from outputs of the trained mask neural network model the mask image of the particular cardiac region.

8. The apparatus of claim 1, wherein the processing circuitry is further configured to apply the determined mask image and the phase image to the inputs of the trained neural network model that was trained with the output training data, which includes the training location probability map, wherein each element in the training location probability map is assigned a value according to a predetermined function of a distance between the element and a predetermined element in the training location probability map.

9. The apparatus of claim 8, wherein each element in the training location probability map is assigned the value according to the function of the distance between the element and the predetermined element in the training location probability map, the predetermined element is a center of a cross section of an artery, and the predetermined function is a decreasing function of a ratio of the distance and a predetermined distance when the distance is less than the predetermined distance, and zero otherwise.

10. The apparatus of claim 1, wherein in calculating the value of the cardiac motion metric, the processing circuitry is further configured to:

determine a particular element in the location probability map having a highest probability, extract, from the phase image, a region of a predetermined size having the particular element as a center, transform the extracted region to remove background portions and generate a transformed region, and calculate, as the value of the cardiac motion metric, based on the transformed region, an entropy value calculated within a circular mask of a predetermined radius.

11. The apparatus of claim 1, wherein the processing circuitry is further configured to receive the cardiac phase corresponding to the acquired phase image, the cardiac phase being obtained from an R-R interval in an electrocardiogram.

12. A method, comprising:

receiving a phase image acquired at a corresponding cardiac phase;

determining, from the received phase image, a mask image of a particular cardiac region;

applying both the determined mask image and the phase image to inputs of a trained neural network model to obtain, from outputs of the trained neural network model, a location probability map, the trained neural network model having been trained with a set of input training data and a corresponding set of output training data, wherein the input training data includes a training mask image and a training phase image, and the output training data includes a training location probability map; and calculating, for the cardiac phase, from the determined location probability map output from the trained neural network model, a value of a cardiac motion metric, wherein the determined location probability map specifies a probable location of a cardiac vessel.

13. The method of claim 12, further comprising:

repeating the receiving, determining, applying, and calculating steps for a plurality of cardiac phases to determine a corresponding plurality of values of the cardiac motion metric; and determining, from the determined plurality of values of the cardiac motion metric, a particular cardiac phase, of the plurality of cardiac phases, having a corresponding value of the cardiac motion metric that is greatest or least among the plurality of values of the cardiac motion metric.

14. The method of claim 12, wherein the receiving step further comprises receiving, as the phase image, a two-dimensional axial image of a heart acquired at the cardiac phase.

15. The method of claim 12, the determining step further comprises applying the phase image to inputs of a trained mask neural network model to obtain, from outputs of the trained mask neural network model the mask image of the particular cardiac region.

16. The method of claim 12, wherein the trained neural network model was trained with the output training data, which includes the training location probability map, wherein each element in the training location probability map is assigned a value according to a predetermined function of a distance between the element and a predetermined element in the training location probability map.

17. The method of claim 16, wherein each element in the training location probability map is assigned the value according to the function of the distance between the element and the predetermined element in the training location probability map, the predetermined element is a center of a cross section of an artery, and the predetermined function is a decreasing function of a ratio of the distance and a predetermined distance when the distance is less than the predetermined distance, and zero otherwise.

18. The method of claim 12, wherein the calculating step further comprises:

determining a particular element in the location probability map having a highest probability, extracting, from the phase image, a region of a predetermined size having the particular element as a center, transforming the extracted region to remove background portions and generate a transformed region, and calculating, as the value of the cardiac motion metric, based on the transformed region, an entropy value calculated within a circular mask of a predetermined radius.

19. The method of claim 12, wherein the receiving further comprises receiving the cardiac phase corresponding to the acquired phase image, the cardiac phase being obtained from an R-R interval in an electrocardiogram.

20. A non-transitory computer-readable medium storing a program that, when executed by processing circuitry, causes the processing circuitry to perform a method, comprising:

receiving a phase image acquired at a corresponding cardiac phase;

determining, from the received phase image, a mask image of a particular cardiac region;

applying both the determined mask image and the phase image to inputs of a trained neural network model to obtain, from outputs of the trained neural network model, a location probability map, the trained neural network model having been trained with a set of input training data and a corresponding set of output training data, wherein the input training data includes a training mask image and a training phase image, and the output training data includes a training location probability map; and calculating, for the cardiac phase, from the determined location probability map output from the trained neural network model, a value of a cardiac motion metric, wherein the determined location probability map specifies a probable location of a cardiac vessel.

\* \* \* \* \*